United States Patent
Watt (10) Patent No.: US 11,262,830 B2
(45) Date of Patent: Mar. 1, 2022

(54) MANAGING EPHEMERAL STORAGE ON A COMPUTING NODE

(71) Applicant: Microsoft Technology Licensing, LLC, Redmond, WA (US)

(72) Inventor: Brennan Alexander Watt, San Clemente, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 157 days.

(21) Appl. No.: 16/680,378

(22) Filed: Nov. 11, 2019

(65) Prior Publication Data

US 2021/0141433 A1 May 13, 2021

(51) Int. Cl.
G06F 1/30 (2006.01)
G06F 12/0804 (2016.01)
G06F 9/455 (2018.01)

(52) U.S. Cl.
CPC .......... G06F 1/30 (2013.01); G06F 12/0804 (2013.01); G06F 9/455 (2013.01)

(58) Field of Classification Search
CPC ......... G06F 1/30; G06F 12/0804; G06F 9/455
See application file for complete search history.

(56) References Cited

U.S. PATENT DOCUMENTS

| | | | | |
|---|---|---|---|---|
| 10,481,660 B1* | 11/2019 | Feldman | ............... | G06F 1/266 |
| 10,671,134 B2* | 6/2020 | Karidis | ............... | G06F 1/28 |
| 2014/0258755 A1* | 9/2014 | Stenfort | ............... | G06F 1/30 |
| | | | | 713/323 |
| 2015/0135003 A1* | 5/2015 | Cota-Robles | ....... | G06F 12/0815 |
| | | | | 714/6.3 |
| 2015/0362983 A1* | 12/2015 | Frick | .............. | G06F 1/28 |
| | | | | 713/324 |
| 2016/0246345 A1* | 8/2016 | Johnston | ............ | G06F 1/26 |
| 2016/0283336 A1* | 9/2016 | Petersen | ............ | G06F 1/30 |
| 2017/0308142 A1* | 10/2017 | Altobelli | ............ | H02J 7/0013 |

(Continued)

FOREIGN PATENT DOCUMENTS

CN 103488578 A 1/2014

OTHER PUBLICATIONS

"International Search Report and Written Opinion Issued in PCT Application No. PCT/US20/057582", dated Feb. 10, 2021, 13 Pages.

*Primary Examiner* — Aurel Prifti
(74) *Attorney, Agent, or Firm* — Ray Quinney & Nebeker P.C; James Bullough (57) ABSTRACT

The present disclosure relates to systems, methods, and computer readable media for identifying and responding to one or more power loss events on a computing node. For example, systems disclosed herein may relate to management of a power loss event on a computing node hosting one or more compute platforms thereon. The systems disclosed herein may implement a power handling configuration that identified a subset of data from a volatile portion of a storage system to prioritize for storage on a non-volatile portion of the storage system. By selectively identifying and flushing data associated with compute platforms hosted by a computing node, systems described herein may significantly reduce demand for capacitance on cloud computing systems while optimizing other performance parameters (e.g., write performance, hardware durability) of devices on cloud computing systems.

20 Claims, 6 Drawing Sheets

(56) References Cited

U.S. PATENT DOCUMENTS

| | | | |
|---|---|---|---|
| 2018/0032390 A1* | 2/2018 | Rahmanian | G06F 1/30 |
| 2018/0095872 A1* | 4/2018 | Dreier | G06F 3/067 |
| 2018/0196816 A1* | 7/2018 | Maybee | G06F 3/0605 |
| 2018/0276092 A1* | 9/2018 | Nelson | G06F 3/0619 |
| 2019/0042113 A1* | 2/2019 | Li | G06F 1/30 |
| 2019/0042414 A1* | 2/2019 | Juenemann | G06F 12/0246 |
| 2019/0205214 A1* | 7/2019 | Morning-Smith | G06F 11/1441 |
| 2019/0278505 A1* | 9/2019 | Ono | G06F 1/30 |
| 2019/0377676 A1* | 12/2019 | Szczepanik | G06F 12/0868 |
| 2019/0384872 A1* | 12/2019 | Chung | G06F 12/0868 |
| 2020/0327055 A1* | 10/2020 | Mao | G06F 12/0804 |
| 2020/0336798 A1* | 10/2020 | Asarikuniyil | H04N 21/8456 |
| 2021/0034128 A1* | 2/2021 | Suljic | G06F 3/0634 |
| 2021/0034130 A1* | 2/2021 | Guim Bernat | G06F 1/28 |

* cited by examiner

MANAGING EPHEMERAL STORAGE ON A COMPUTING NODE

BACKGROUND

A cloud computing system refers to a collection of computing devices capable of providing remote services and resources. For example, modern cloud computing infrastructures often include a collection of physical server devices organized in a hierarchical structure including computing zones, virtual local area networks (VLANs), racks, fault domains, etc. These cloud computing infrastructures may provide computing resources to users including a variety of processors, memory, and storage devices capable of providing different services to users of the cloud computing system.

As cloud computing continues to grow in popularity and complexity, implementing efficient use of computing resources has become increasingly difficult. For example, as cloud computing applications continue to become more flexible, conventional techniques for managing computing resources have become inefficient for select types of services. For instance, while some computing nodes may include hardware that is well-equipped to provide efficient storage services, the same computing nodes may include insufficient or excessive memory and/or storage resources for other types of services (e.g., compute services). Moreover, processing resources and hardware real estate are often allocated inefficiently depending on the type of applications hosted by one or more computing devices.

These and other problems exist with regard to efficiently providing and managing computing resources on a cloud computing system.

DETAILED DESCRIPTION

The present disclosure is generally related to managing ephemeral storage of a computing node by implementing a power handling configuration on the computing node. In particular, the present disclosure relates to implementing a power handling configuration on a computing node of a cloud computing system having a combination of hardware and software configured to host a compute platform for user(s) of the cloud computing system. The present disclosure implements an ephemeral data management system to respond to a power loss event (e.g., an unplanned power loss event) on the computing node in a way that efficiently utilizes hardware resources of the computing node. For example, features and functionalities described herein enable the computing node to respond to a detected power loss event in such a way that reduces demand for capacitors on the computing node as well as enables the computing node to more efficiently allocate processing resources to various functions of the computing node.

For example, as will be discussed in more detail herein, an ephemeral data management system may detect a power loss event (e.g., an unexpected or unplanned power loss event) for a computing node having a host system (e.g., computer processing unit(s) and memory) and a storage system (e.g., SSD and/or hard-disk drive (HDD) systems) that cooperatively host a compute platform for one or more users of a cloud computing system. The ephemeral data management system may identify a power handling configuration including instructions for responding to a power loss event as well as an identification of a subset of data (e.g., a subset of metadata) to prioritize for storage on a non-volatile storage. The ephemeral data management system may further respond to the detected power loss event in accordance with the power handling configuration by selectively storing the identified subset of data to the non-volatile storage prior to a set of capacitors discharging as a result of the power loss event.

As will be discussed in further detail below, the present disclosure includes a number of practical applications having features described herein that provide benefits and/or solve problems associated with responding to a power loss event. For example, by identifying a subset of data from a volatile portion of the storage system (e.g., dynamic random access memory (DRAM) and/or static random access memory (SRAM)) for selective storage on a non-volatile portion of the storage system, the ephemeral data management system may reduce the expense of processing resources without significantly impacting performance of the computing node. Indeed, depending on unique characteristics of the compute platform hosted by the computing node, the ephemeral data management system may facilitate faster service recovery after a planned or unplanned power loss event without a noticeable impact on performance of the system.

In addition to processing savings, features and functionality described herein may significantly reduce a demand for hardware space by capacitors designed to protect various types of data from power loss events (e.g., unplanned power loss events). In particular, because conventional devices often allocate a significant portion of hardware space to a set of capacitors (e.g., a capacitor bank), these devices are limited in the amount of space available for storage and processing resources. Nevertheless, using features and functionality described herein, computing nodes having components that are configured to host various compute platforms may significantly reduce capacity demand thereby allowing additional processing and/or storage hardware to be included within a single computing node.

In addition to reducing demand for capacitors on storage hardware, the ephemeral data management system may further enable owners and/or distributors of cloud computing hardware to tune settings or parameters of storage devices to improve overall performance of the cloud computing system. For example, by selectively storing only a portion of data from the volatile portion as well as de-prioritizing storage retention, an individual may tune firmware and/or hardware to generally allocate additional resources to improve write performance and/or system endurance of the computing node. Re-allocating these resources may improve performance of processors, memory, and storage on computing nodes, particularly where those computing nodes are hosting compute platforms (e.g., compute-based virtual machines) for one or more users of the cloud computing system.

As illustrated in the foregoing discussion, the present disclosure utilizes a variety of terms to described features and advantages of the systems described herein. Additional detail is now provided regarding the meaning of such terms. For example, as used herein, a "cloud computing system" refers to a network of connected computing devices (e.g., computing nodes) that provide a variety of services to users of the cloud computing system (e.g., via client devices of the users). For example, as mentioned above, a cloud computing system may refer to a distributed computing system having a collection of physical server devices organized in a hierarchical structure including clusters, computing zones, virtual local area networks (VLANs), racks, fault domains, etc. As used herein, a "computing node" may refer to any server device or computing device including server device(s) of a cloud computing system. The cloud computing system may refer to a private or public cloud computing system. In one or more embodiments described herein, the computing node refers specifically to enterprise drives (as opposed to client drives). In particular, one or more embodiments described herein refer specifically to enterprise drives that provide compute services (as opposed to storage services).

As mentioned above, a cloud computing system may provide a variety of services to users of the cloud computing system including, by way of example, a computing service. As used herein, a "computing service" or "compute platform" may refer to cloud-based services in which computing resources (e.g., processing resources) are provided for a variety of applications. In one or more implementations described herein, a computing service or platform refers to one or more virtual machines on which a software or application is executed. Moreover, computing services may refer to any service other than storage services in which data is maintained for on-demand retrieval via HDD and/or SDD devices. By way of example, computing services may include virtual servers (e.g., virtual machines), platform as a service (PaaS) models, scaling services, virtual support services, as well as a variety of management tools (e.g., server automation services, logging and monitoring, server automation) or other services. In one or more embodiments, a compute platform refers to any service in which user data (e.g., data unique to a user of the cloud computing system) is locally maintained (e.g., on the same computing node as a host system) for less than a threshold duration of time on one or more non-volatile storage systems of a cloud computing system.

In one or more embodiments described herein, a computing node includes a host system and a storage system. As used herein, a host system may include a combination of processing hardware (e.g., CPUs), memory of the computing node, or other mid to high level processing devices (e.g., devices having higher access speeds and/or instruction executing capacity). A storage system may include an SSD storage (or other non-volatile storage system) having one or more non-volatile storage devices. In one or more embodiments discussed herein, the storage system may further include a portion of volatile storage for interacting with the host system and flushing data to the non-volatile storage of the storage system. In one or more embodiments, the storage system includes a combination of NAND storage, SRAM, and DRAM, as will be discussed in further detail below.

As used herein, a "power loss event" may refer to an instance in which a power source is disconnected from or otherwise ceases providing power to a system. For example, a power loss event may refer to a computing device losing power or being disconnected from a power source (e.g., being unplugged). A power loss event may further refer to a shutdown or reset of a system. Other examples of power loss events may refer to an eviction of a user or owner of a virtual machine from the cloud computing system. In one or more embodiments described herein, a power loss event refers specifically to an unplanned power loss event where a tenant or owner of a virtual machine is evicted (temporarily or permanently) from the cloud computing system and/or where power unexpectedly stops being supplied to a storage system. In each example, a power loss event involves one or more capacitors providing power temporarily to one or more components of the storage system, which will be discussed in further detail below in connection with FIGS. 3A-3B.

Figure 1:
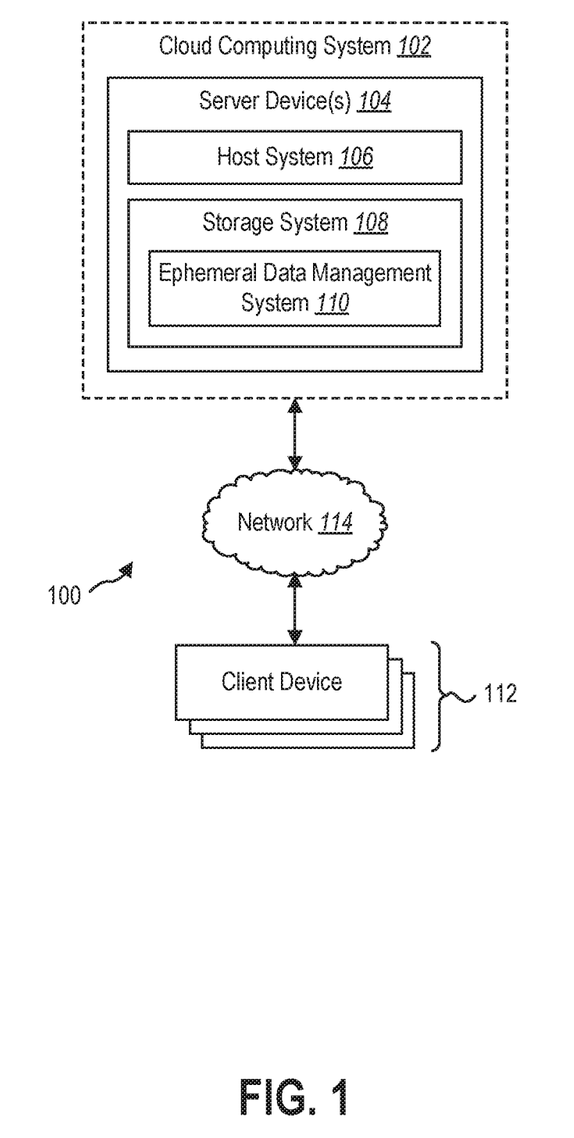
FIG. 1 illustrates an example environment of a network including an ephemeral data management system in accordance with one or more embodiments.

Additional detail will now be provided regarding power management of a storage system on a cloud computing system in relation to illustrative figures portraying example implementations. For example, FIG. 1 illustrates an example environment 100 including a cloud computing system 102 that provides a variety of computing services to users of the cloud computing system 102. As shown in FIG. 1, the cloud computing system 102 includes one or more server device(s) 104 (e.g., computing nodes) having hardware and/or software components for providing features and functionality described herein. In the example shown in FIG. 1, the server device(s) 104 may include a host system 106 and a storage system 108 having an ephemeral data management system 110 implemented thereon.

As further shown, the environment 100 may include a plurality of client devices 112 in communication with the cloud computing system 102 (e.g., in communication with one or more server device(s) 104 and/or virtual machines hosted thereon via a network 114). The client devices 112 may refer to various types of client devices. For instance, a client device may refer to a mobile device such as a mobile telephone, a smart phone, a personal digital assistant (PDA), a tablet, a laptop, or wearable computing device (e.g., a headset or smartwatch). A client device may also refer to a non-mobile device such as a desktop computer, a server node (e.g., from another cloud computing system), or other non-portable device. The client devices 112 and/or the server device(s) 104 may include additional features and functionality as generally discussed below in connection with FIG. 5.

The network 114 may include one or multiple networks that use one or more communication platforms or technologies for transmitting data. For example, the network 114 may include the Internet or other data link that enables transport of electronic data between respective client devices 112 and components (e.g., server device(s) 104 and/or virtual machines thereon) of the cloud computing system 102.

As mentioned above, and as will be discussed in further detail below, the host system 106 may provide processing and/or memory resources in connection with a virtual machine hosted by the server device(s) 104. For example, the host system 106 may host or otherwise provide one or more virtual machines to any number of users of the cloud computing system 102. For instance, a virtual machine (or other emulation of a computer system) may provide processing functionality for a compute platform or other compute-based service to users of the client devices 112. Indeed, the host system 106 may provide access to one or more compute platforms to multiple users of the cloud computing system 102.

While the host system 106 may include processing and memory resources, the host system 106 may nonetheless utilize storage resources provided by the storage system 108. For example, the storage system 108 may provide non-volatile storage to store user data including any data associated with users of the cloud computing system 102. The storage system 108 may include a variety of storage devices. For example, the storage system 108 may include SSD storage, HDD storage, or a combination of different types of storage devices. While connected to a power source powering the server device(s) 104, the host system 106 may read data from the storage system 108 and/or write data to the storage system 108.

While the storage system 108 may primarily serve as a source of non-volatile storage, in one or more embodiments, the host system 106 treats the storage system 108 as an ephemeral storage resource. In particular, where the host system 106 hosts a compute-based virtual machine or other compute platform that provides primarily compute services (or any non-storage services), the host system 106 may utilize non-volatile storage resources of the storage system 108 as a pseudo-memory or as an ephemeral data storage resource. Thus, although the virtual machine may access data from the storage while the virtual machine is up and running (e.g., servicing a user), the user data from the storage may become irrelevant after the virtual machine powers off or is otherwise vacated in a variety of cloud-based applications hosted by the host system 106.

In one or more embodiments, the storage system 108 only stores (or guarantees reliability of) user data associated with users of the compute platform until the compute platform is vacated or powered down by the server device(s) 104. In one or more implementations, however, the user data is stored in a long-term storage on another device of the cloud computing system 102. Accordingly, while an SSD of the storage system 108 may function as an ephemeral storage resource, the cloud computing system 102 may provide a less expensive HDD storage on another device of the cloud computing system 102 as a backup storage in which user data may be accessed if needed.

As mentioned above, and as shown in FIG. 1, the storage system 108 includes an ephemeral data management system 110 implemented thereon. As will be discussed in further detail below, the ephemeral data management system 110 may include software and/or firmware for handling a power loss event. In particular, the ephemeral data management system 110 may handle storage of data on the storage system 108 in response to a power loss event in such a way that reduces a demand for capacitors on the storage system 108 without having a negative impact on users of the cloud computing system 102. Moreover, by selectively storing data in accordance with one or more embodiments described herein, the ephemeral data management system 110 may further enable or facilitate tuning of firmware and/or software on the storage system 108 to allocate resources to write performance and/or durability, particularly in compute applications where non-volatile data of the storage system 108 is being used as an ephemeral data resource for a limited lifetime or duration of a compute-based virtual machine.

Figure 2:
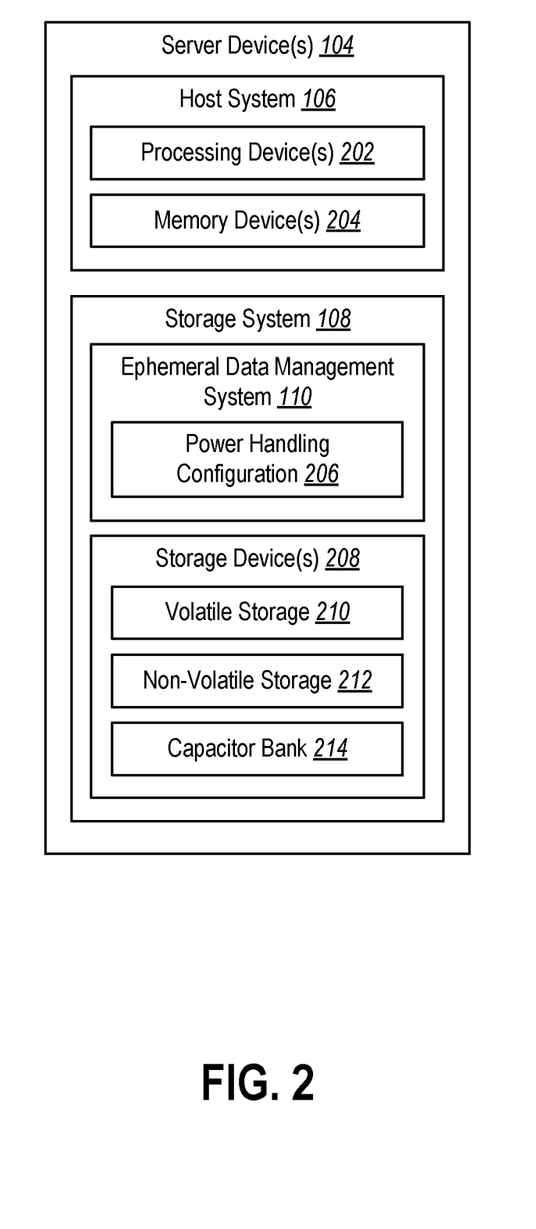
FIG. 2 illustrates an example server device having an ephemeral data management system implemented thereon in accordance with one or more embodiments.

Additional detail in connection with the ephemeral data management system 110 will now be discussed in connection with FIG. 2. In particular, FIG. 2 illustrates an example of the server device(s) 104 shown in FIG. 1 including the host system 106 and the storage system 108. In particular, as shown in FIG. 2, the host system 106 may include processing device(s) 202 and memory device(s) 204. The processing device(s) 202 may include one or more computer processing units (CPUs) and the memory device(s) 204 may refer to a variety of volatile storage devices for use by the host system 106 in hosting one or more compute applications to service users of the cloud computing system 102.

As further shown, the storage system 108 may include the ephemeral data management system 110. The ephemeral data management system 110 may include a power handling configuration 206 for managing storage of data (e.g., user data, metadata) on storage device(s) 208 of the storage system 108. As shown in FIG. 2, the storage device(s) 108 may include a volatile storage 210, a non-volatile storage 212, and a capacitor bank 214. In one or more embodiments, the storage device(s) 208 refers to an SSD storage including the volatile storage 210 (e.g., volatile portion(s) of an SSD), the non-volatile storage 212, and the capacitor bank 214.

The non-volatile storage 212 may include any type of storage device(s) capable of storing data and maintaining a state of data for a period of time after the server device(s) 104 (or the storage system 108) has been turned off or where a virtual machine hosted by the host system 106 has been vacated. The non-volatile storage 212 may include NAND storage, flash storage, or a combination of one or more types of storage capable of maintaining data without a constant supply of power. In one or more embodiments, the non-volatile storage 212 maintains data for a duration of time based on one or more tuning parameters of the power handling configuration 206 associated with data retention. For example, depending on various tuning parameters (e.g., NAND tuning settings), the non-volatile storage may maintain data for a few months or multiple years.

As just mentioned, the tuning parameters may identify an allocation of processing and/or storage resources on the server device(s) 104 based on various factors. In one or more embodiments, the tuning parameters are established prior to deployment of the server device(s) 104 on the cloud computing system 102 (e.g., by a device manufacturer or owner of the cloud computing system 102). In one or more implementations, the tuning parameters are dynamically set or modified after deployment (e.g., by the ephemeral data management system 110) based on particulars of the compute platform. For example, the tuning parameters may be determined based on a capacitance of the capacitor bank 214 and/or an amount of data from an identified subset of data to be flushed to the non-volatile storage 212. In one or more embodiments, the tuning parameters are identified by the power handling configuration 206.

The volatile storage 210 may include any type of non-persistent storage on hardware of the storage device(s) 208 capable of interacting with the non-volatile storage 212 as well as the host system 106. For example, in one or more embodiments, the volatile storage 210 includes a combination of processors and memory on the same chip as the non-volatile storage 212. The volatile storage 210 may include hardware capable of executing power handling configuration 206 instructions as well as generally managing data maintained on the storage device(s) 208. By way of example, the volatile storage 210 may include a combination of DRAM and SRAM hardware.

In one or more embodiments, the volatile storage 210 maintains in-flight data. As used herein, in-flight data may refer to user data that has been received from the host system 106 and which has yet to be stored on the non-volatile storage 212. For instance, because non-volatile storage generally has slower access and write speeds than volatile storage 210, the volatile storage 210 may receive user data from the host system 106 and immediately indicate to the host system 106 that the user data has been received. After providing the indication that the in-flight data has been received, the volatile storage 210 may then cause the in-flight data to be stored on the non-volatile storage 212 without the host system 106 having to wait for the transfer of data from the host system 106 to the non-volatile storage 212.

In addition to in-flight user data, the volatile storage 210 may include a combination of different types of metadata. For example, the volatile storage 210 may maintain user metadata descriptive of metadata that has been previously stored on the non-volatile storage 212. For instance, the volatile storage 210 may maintain metadata including a map of stored user data (e.g., a flash translation layer (FTL) map) to enable faster access to data stored on the non-volatile storage 212. The user metadata may further include information such as trim data indicating where corresponding user data is stored and encryption data indicating encryption details of the user data and how it is stored.

In addition to user metadata, the volatile storage 210 may maintain system metadata. The system metadata may include any data descriptive of the storage system 108 (e.g., hardware of the storage system 108). Examples of system metadata include information about age of one or more hardware devices, model information, a status of wear for the device (e.g., a tracked number of writes/reads) or other information that is associated with the hardware or otherwise unrelated to the user data. System metadata may further include information about how much of the storage system 108 (e.g., the SSD) has been used or other data from a system log. The system metadata may also include an indication of a wear out status (e.g., an identified number of writes), capacitor wear out, and a firmware history. In one or more embodiments described herein, the system metadata refers to any metadata other than user metadata.

As further shown in FIG. 2, the storage device(s) 208 includes a capacitor bank 214. The capacitor bank 214 may refer to a set of any number of capacitors. The number and associated capacitance of the capacitors of the capacitor bank 214 may be determinative of a time that data may be flushed from the volatile storage 210 to the non-volatile storage 212 (e.g., in the event of a power loss). The capacitor bank 214 may include multiple capacitors in parallel. Alternatively, the capacitor bank 214 may include a single capacitor coupled to the volatile storage 210 and non-volatile storage 212 of the storage device(s) 208.

The power handling configuration 206 may include data and instructions associated with how to handle a power loss event. For example, the power handling configuration 206 may include instructions for how to detect a power loss event, how to determine what type of power loss event has occurred, and what steps to take in response to the power loss event. The power handling configuration 206 may include different instructions for responding to different types of power loss events (e.g., planned v. unplanned power loss events).

In one or more embodiments, the power handling configuration 206 further includes information about a priority or hierarchy of different types of data. For example, the power handling configuration 206 may identify a priority of data (e.g., in-flight data and/or metadata) to selectively store to the non-volatile storage 212 in response to a detected power loss event. In one or more implementations, the power handling configuration 206 includes instructions for prioritizing storage of metadata prior to flushing any in-flight data or user data to the non-volatile storage. For example, the power handling configuration 206 may identify a subset of data (e.g., system metadata, user metadata, in-flight data) to prioritize in storing to the non-volatile storage 212 of the storage system 108 in response to detecting a power loss event.

In one or more embodiments, the power handling configuration 206 identifies a subset of data by identifying locations of the data on the storage system 108. For example, where the volatile storage 210 includes an SRAM component having in-flight data thereon and a DRAM component having user metadata and system metadata thereon, the power handling configuration 206 may identify the subset of data on the DRAM to prioritize for storage over the in-flight data on the SRAM. In one or more embodiments, the power handling configuration 206 identifies logical addresses or a range of addresses where specific metadata (e.g., the system metadata) is maintained. In this way, the ephemeral data management system 110 may quickly retrieve prioritized data to store to the non-volatile storage 212 in response to a power loss event.

As noted above, the power handling configuration 206 may identify a subset of data (e.g., a subset of data from the volatile storage 210) to prioritize for storage on the non-volatile storage 212. In one or more embodiments, this may include an indication that the system metadata should be flushed to the non-volatile storage 212 before any other type of data. Moreover, in some or all types of power loss events, the power handling configuration 206 may simply indicate that the system metadata should be flushed to the non-volatile storage 212 without storing any additional data (e.g., user metadata, in-flight data) from the volatile storage 210 to the non-volatile storage 212.

As an alternative to simply identifying a subset of data for storage, the power handling configuration 206 may identify a hierarchy of data including select portions of the user metadata and/or in-flight data. For example, the power handling configuration 206 may identify certain users or accounts of the cloud computing system 102 having a higher priority than other users or accounts of the cloud computing system 102. In this example, the configuration may identify subsets of user metadata and/or subsets of in-flight data to store (e.g., after first flushing the system metadata to the non-volatile storage 212) prior to other subsets of metadata and/or subsets of in-flight data.

While one or more embodiments described herein relate specifically to storing data for host systems and storage systems that are hosting compute platforms, the power handling configuration 206 may nonetheless include specialized instructions for responding to power loss events for other combinations of platforms. For example, in the event that the host system 106 is hosting compute platforms in combination with storage platforms, the power handling configuration 206 may identify a subset of data (e.g., system metadata) associated with both the compute platform(s) and/or storage platform(s) to prioritize for storage. The power handling configuration 206 may then identify a subset of data (e.g., in-flight and/or user metadata) for storage-related applications to prioritize over data associated with compute-related applications.

In one or more embodiments, the ephemeral data management system 110 may continue storing data as identified by the power handling configuration 206 until power supplied by the capacitor bank 214 falls below a threshold. For example, upon storing the system metadata (e.g., a first subset of identified data), the ephemeral data management system 110 may determine if sufficient charge exists to then store additional data to the non-volatile storage 212. Where sufficient charge still exists after flushing the system metadata to the non-volatile storage 212, the ephemeral data management system 110 may proceed to flush user metadata and/or in-flight data corresponding to various user accounts (e.g., high priority accounts) to the non-volatile storage 212. After storing the data, the ephemeral data management system 110 may iteratively determine whether to store additional sets of data and metadata until the capacitor bank 214 discharges below a threshold amount.

In the event that not all of the metadata and/or in-flight data is preserved, the ephemeral data management system 110 may nonetheless retrieve the data from a long-term storage (e.g., an HDD or other SDD storage) from another computing node on the cloud computing system 102 if needed. In particular, in one or more embodiments, the ephemeral data management system 110 may restore a present state of memory by retrieving an FTL map or other metadata and associated updates previously stored to the non-volatile storage 212 (e.g., an SDD). In this way, the ephemeral data management system 110 may further reduce impact for many individuals or accounts while also enabling retrieval of user data in the event that a user needs to recover a lost state of data for a compute platform.

Figure 3A:
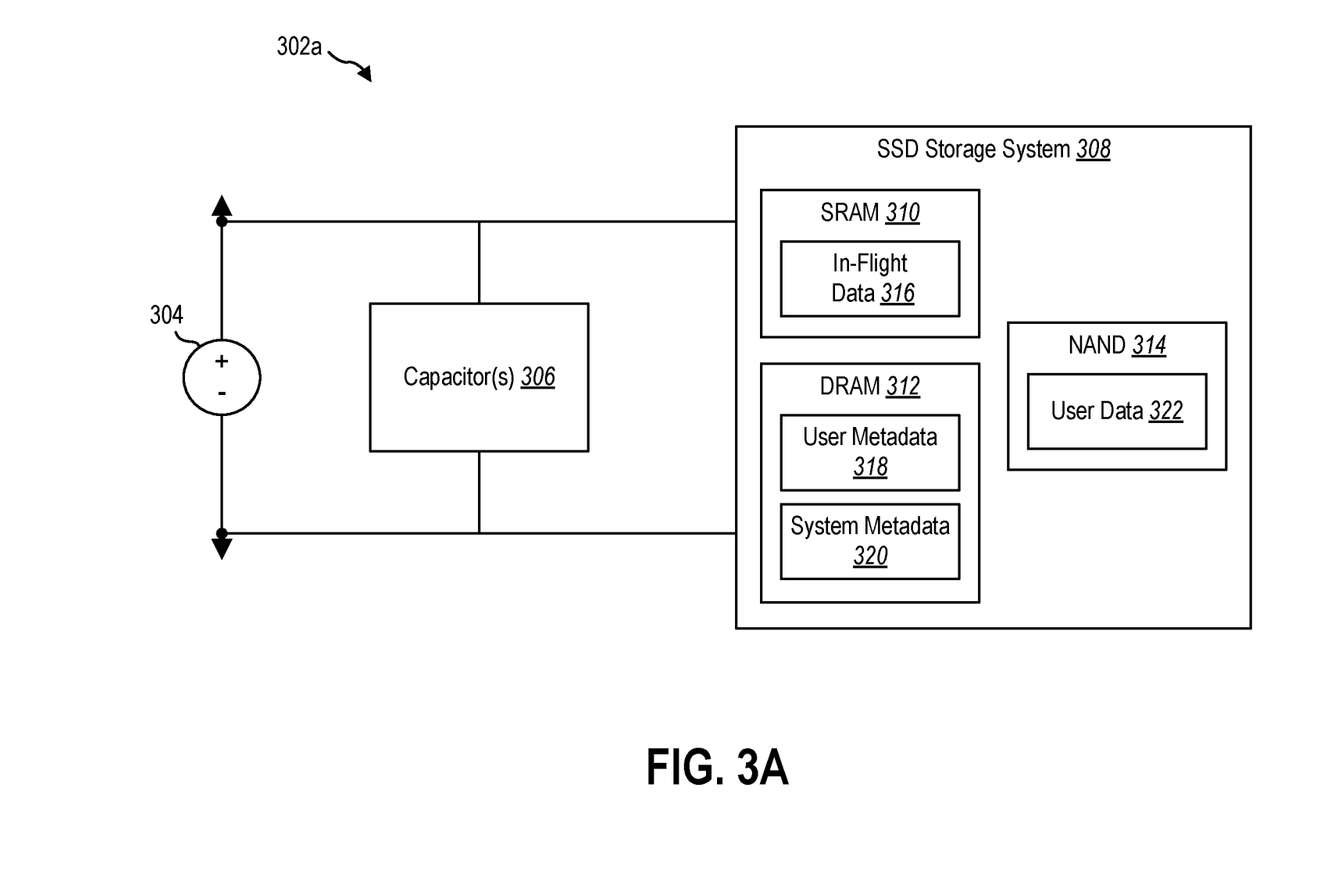
FIG. 3A illustrates an example configuration of a solid-state drive (SSD) storage system prior to experiencing a power loss event in accordance with one or more embodiments.
Figure 3B:
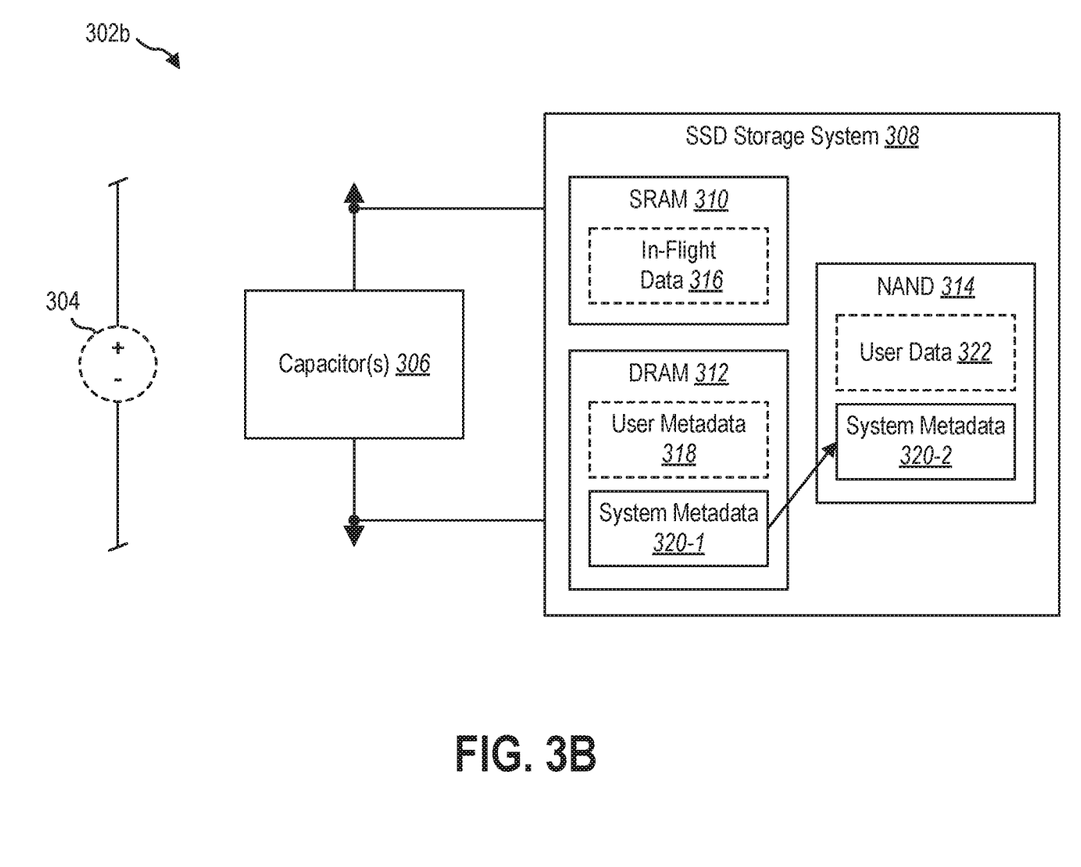
FIG. 3B illustrates an example configuration of the SSD storage system from FIG. 3A responding to a power loss event in accordance with one or more embodiments.

Additional detail will now be discussed in connection with an example implementation in which data is selectively stored on a non-volatile portion of storage from a volatile portion of storage in response to a detected power loss event. In particular, FIG. 3A illustrates an example storage system having data thereon prior to experiencing a power loss event. In contrast, FIG. 3B illustrates the example storage system of FIG. 3A in response to experiencing a power loss event and based on instructions from a power handling configuration 206. The movement and selective storage of data may be executed by an ephemeral data management system 110 having similar features and functionality described above in connection with one or more embodiments.

For example, FIG. 3A illustrates a powered-on configuration 302a in which an SSD storage system 308 is powered on and receives power to components thereon from a power source 304. The SSD storage system 308 may be an example of the storage system 108 discussed above in connection with FIGS. 1-2. The power source 304 may refer to any type of power source capable of providing constant power to the SSD storage system 308. For example, the power source 304 may refer to a power source of a computing node on which the SSD storage system 308 and an associated host system (e.g., host system 106) is implemented.

As further shown, the powered-on configuration 302a includes a set of capacitors 306 (e.g., a capacitor bank) having one or more capacitors coupled to the SSD storage system 308, The set of capacitors 306 may include multiple capacitors coupled in parallel to the power source 304. In the powered-on configuration 302a, the capacitors 306 may be fully charged and ready to provide power as soon as the power source 304 is turned off or becomes disconnected from components of the SSD storage system 308.

Similar to one or more embodiments described herein, the SSD storage system 308 includes volatile portions and non-volatile portions of storage. For example, the SSD storage system 308 may have a volatile portion including SRAM hardware 310 (or simply "SRAM 310") and DRAM hardware 312 (or simply "DRAM 312"). As further shown in FIG. 3A, the SSD storage system 308 may have a non-volatile portion including NAND hardware 314 (or simply "NAND 314").

As shown in FIG. 3A, the SRAM 310 may include in-flight data 316. As mentioned above, the in-flight data 316 may include user data received from memory (or another component of a host system) that has yet to be stored on the NAND 314. In one or more embodiments, the in-flight data 316 refers to data that the SSD storage system 308 has informed a host application has been received so that the host system need not further dedicate any resources to maintaining copies of the same data or otherwise ensuring that said data is stored on the NAND 314.

As further shown and in accordance with one or more embodiments described above, the DRAM 312 may include different types of metadata. For example, the DRAM 312 may include user metadata 318. The user metadata 318 may include any information associated with corresponding user data (e.g., user data 322) stored on the NAND 314 (or other remote non-volatile storage). In addition, the DRAM 312 may include system metadata 320. As discussed above, the system metadata 320 may include any information associated with hardware of the SSD storage system 308. In one or more embodiments, the system metadata 320 refers to any metadata that is not the user metadata 318.

As further shown, the NAND 314 may include user data 322. The user data 322 may include data associated with different users of a cloud computing system 102. For example, the user data 322 may refer to data about a single user of a specific virtual machine that has been created for the user. Alternatively, the user data 322 may include data about multiple users having data stored on the SSD storage system 308.

While FIG. 3A illustrates an example in which the user metadata 318 and the user data 322 are represented by single blocks within respective DRAM 312 and NAND 314 components, it will be understood that the user metadata 318 and user data 322 may include discrete portions of data corresponding to specific users and/or accounts of the cloud computing system 102. For example, the DRAM 312 may include any number of blocks of user metadata 318 corresponding to respective users or accounts. In addition, the NAND 314 may include any number of blocks of user data 322 corresponding to respective users or accounts. In one or more embodiments, the SSD storage system 308 includes data about users indicating a priority in which the user data 322 and/or user metadata 318 should be stored on the NAND 314 in the case of a power loss event.

It will be understood that FIG. 3A is an example implementation that includes a specific combination of SRAM 310, DRAM 312, and NAND 314 that make up components of an example storage system as discussed above. Other example storage systems may include other types of storage hardware and other components. For example, a storage system may include HDD storage rather than NAND or SSD storage. In one or more embodiments, a storage system may include a combination of HDD and SDD components or multiple SRAM, DRAM, and/or NAND components within a single SSD storage system 308. In one or more embodiments, a storage system includes multiple SSD storage devices that cooperatively store data and metadata for a corresponding host application. In one or more embodiments, a storage system may include components shared between multiple devices. For example, a storage system may include an SRAM, DRAM and NAND in accordance with FIG. 3A in addition to HDD or SDD storage on another computing device.

Moving on, FIG. 3B illustrates an example powered-off configuration 302b showing an implementation of the SSD storage system 308 in response to detecting a power loss event. In particular, FIG. 3B illustrates an example handling of a power loss event based on instructions from a power handling configuration 206.

As shown in FIG. 3B, the power source 304 has been disconnected from the SSD storage system 308. As a result, the capacitors 306 have become a temporary power source for components 310-314 of the SSD storage system 308. Upon becoming disconnected from the power source 304, the capacitors 306 may begin to discharge. The SSD storage system 308 may detect that the power source 304 has been disconnected and begin executing instructions from a power handling configuration 206.

In particular, where the power handling configuration 206 identifies a subset of data including system metadata, the SSD storage system 308 may respond to the power loss event by identifying a first instance of the system metadata 320-1 on the DRAM 312 and immediately generate a copy of the system metadata 320-2 on the NAND 314. In one or more embodiments, the SSD storage system 308 copies the system metadata 320 and does not flush any additional data to the NAND 314. Thus, after the capacitors 306 discharge, the in-flight data 316 and the user metadata 318 may be discarded without getting backed up to the NAND 314.

As further shown, where the power loss event includes vacation of a virtual machine (or removal of a tenant from the cloud computing system 102), the SSD storage system 308 may additionally discard user data 322 previously stored to the NAND 314. In one or more embodiments, the SSD storage system 308 keeps the user data 322, but because of NAND tuning parameters and/or limited data retention resources dedicated to maintaining a state of the user data 322, the user data 322 may simply be discarded after a short period of time. In contrast, the system metadata 320 may be maintained indefinitely (or for as long as the NAND 314 permits) to serve as a status of the hardware. This system metadata 320 may be used in connection with other tenants or applications of the cloud computing system 102.

As mentioned above, while the power handling configuration 206 may identify a subset of data including only the system metadata 320 for flushing to the NAND 314, in one or more embodiments, the power handling configuration 206 may identify a hierarchy or priority of multiple types of data to store to the NAND 314 in the event of a detected power loss. For example, where the user metadata 318 and/or in-flight data 316 includes data associated with high-priority users or accounts, the power handling configuration 206 may additionally identify subsets of data corresponding to those users or accounts to prioritize over additional subsets of data when storing data to the NAND 314 prior to the capacitors 306 discharging.

Based on this additional information, the SSD storage system 308 may flush portions of the user metadata 318 and/or in-flight data 316 to the NAND 314 (e.g., after first flushing system metadata 320) so long as additional charge remains from the capacitors 306. For example, in one or more embodiments, the SSD storage system 308 may determine if the capacitors 306 have a threshold charge (e.g., a threshold supply voltage) remaining and quickly save additional user metadata 318 and/or in-flight data 316 until the capacitors 306 ultimately discharge or stop providing the threshold amount of charge. The SSD storage system 308 may iteratively store select portions of the user metadata 318 and/or associated in-flight data 316 until the capacitors 306 no longer supply enough power to continue enabling storage of new data on the NAND 314.

In addition to identifying and selectively storing an identified subset of data from the volatile portion to the NAND 314, in one or more embodiments, the SSD storage system 308 further saves charge on the capacitor(s) 306 by selectively shutting down a portion of the volatile portion having data that the SSD storage system 308 does not need. For example, where the power handing configuration 206 identifies only system metadata 320 to flush to the NAND 314, the SSD storage system 308 may shut off the SRAM 310 or selectively uncouple the capacitors 306 from the SRAM 310 to slow down a rate at which the capacitors 306 discharge after losing the constant charge from the power source 304.

Figure 4:
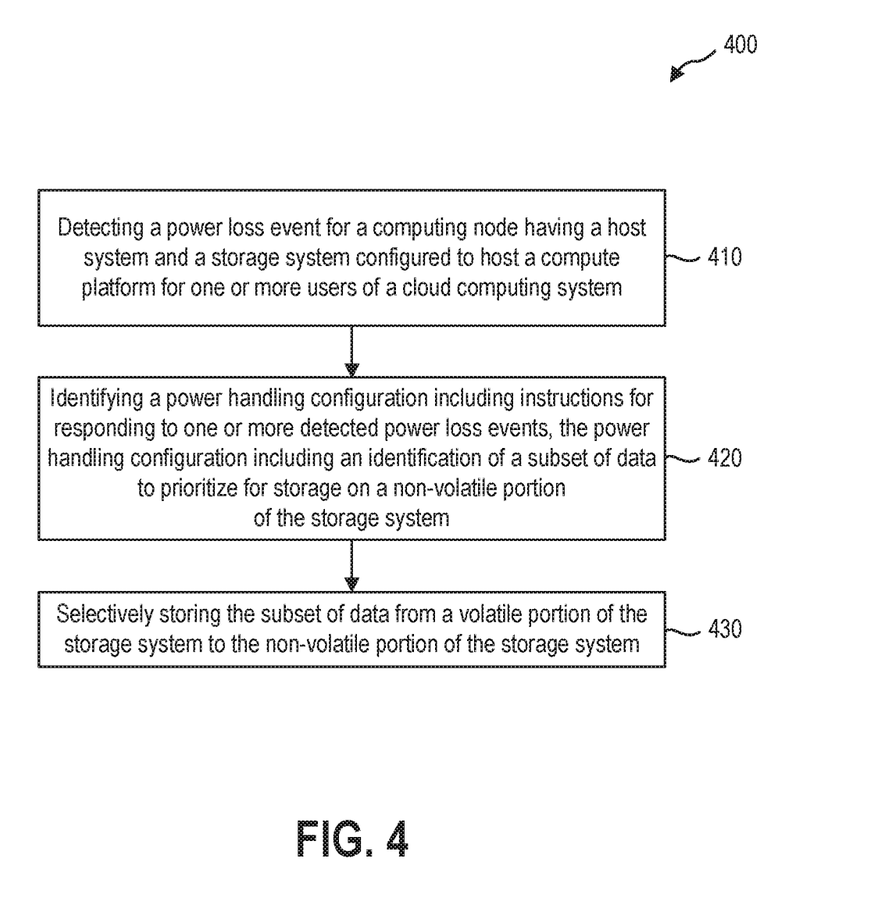
FIG. 4 illustrates an example series of acts for implementing a power handling configuration in response to a detected power loss event in accordance with one or more embodiments.

Turning now to FIG. 4, this figure illustrates example flowcharts including series of acts for detecting a power loss event and selectively storing data to a non-volatile storage in response to detecting the power loss event. While FIG. 4 illustrates acts according to one or more embodiments, alternative embodiments may omit, add to, reorder, and/or modify any of the acts shown in FIG. 4. The acts of FIG. 4 can be performed as part of a method. Alternatively, a non-transitory computer-readable medium can include instructions that, when executed by one or more processors, cause a computing device to perform the acts of FIG. 4. In still further embodiments, a system can perform the acts of FIG. 4.

FIG. 4 illustrates a series of acts 400 for detecting a power loss event and selectively storing data to a non-volatile storage. For example, the series of acts 400 includes an act 410 of detecting a power loss event for a computing node having a hos system and a storage system configured to host a compute platform for one or more users of a cloud computing system. In one or more implementations, the act 410 involves detecting a power loss event for a computing node of a cloud computing system where the computing node includes a host system and a storage system. The host system and the storage system may be configured to host a compute platform for one or more users of the cloud computing system. In addition, the storage system may include a volatile portion, a non-volatile portion, and one or more capacitors coupled to the volatile portion and the non-volatile portion of the storage system. In one or more embodiments, the power loss event is an unplanned power loss event.

As further shown, the series of acts 400 includes an act 420 of identifying a power handling configuration having instructions for responding to one or more detected power loss events. The power handling configuration may include an identification of a subset of data to prioritize for storage on a non-volatile portion of the storage system. In one or more embodiments, the act 420 includes identifying a power handling configuration having instructions for responding to one or more power loss events where the power handling configuration includes an identification of a subset of data on the volatile portion of the storage system to prioritize for storage on the non-volatile portion of the storage system.

As further shown, the series of acts 400 includes an act 430 of selectively storing the subset of data from a volatile portion of the storage system to a non-volatile portion of the storage system. In one or more embodiments, the act 430 includes, in response to the detected power loss event and in accordance with the identified subset of data from the power handling configuration, selectively storing the subset of data from the volatile portion of the storage system to the non-volatile portion of the storage system.

In one or more embodiments, the compute platform includes a virtual machine (VM) hosted on the computing node. In addition, the series of acts 400 may include detecting the power loss event based on a user of the VM being evicted from the node or the VM being removed from the computing node. In addition, in one or more implementations, the one or more capacitors include a combined capacitance corresponding to a quantity of data from the identified subset of data from the power handling configuration. Moreover, in one or more embodiments, selectively storing the subset of data includes flushing the subset of data to the non-volatile portion of the storage system prior to the one or more capacitors discharging.

In one or more embodiments, the host system and the storage system are configured to host the compute platform for a plurality of users of the cloud computing system. In addition, the power handling configuration may include an identification of at least one user from the plurality of users to prioritize in selectively storing additional data from the volatile portion of the storage system to the non-volatile portion of the storage system. The series of acts 400 may additionally include determining that a charge of the one or more capacitors is above a threshold charge and, based on the charge being above the threshold charge, selectively storing the additional data associated with the at least one user from the volatile portion of the storage system to the non-volatile portion of the storage system.

In one or more embodiments, the data from the volatile portion of the storage system includes in-flight data including at least a portion of user data, user metadata associated with user data stored on the non-volatile portion of the storage system, and system metadata associated with one or more characteristics of hardware of the storage system. In addition, in one or more implementations, selectively storing the subset of data includes flushing the system metadata to the non-volatile portion of the storage system without storing the in-flight data and the user metadata to the non-volatile portion of the storage system.

In one or more embodiments, the series of acts 400 includes recovering a state of the computing node where the state refers to a state of the computing node (e.g., a state of memory and/or storage of the computing node) prior to detecting the power loss event. Recovering the state of the computing node may include accessing user data from a long-term storage backup service provided by another computing node of the cloud computing system.

In one or more embodiments, the storage system includes a solid-state drive (SSD) system. The SSD system may include a static random-access memory (SRAM) component and a dynamic random-access memory (DRAM) component. In one or more implementations, the subset of data includes system metadata from the DRAM component of the SSD system. In one or more embodiments, the series of acts 400 includes, in response to the detected power loss event and in accordance with the power handling configuration, shutting down the SRAM component to prevent the SRAM component from receiving any charge from the set of capacitors. In one or more embodiments, the subset of data refers to system metadata from the DRAM component.

In one or more embodiments, the series of acts 400 includes iteratively storing portions of data on the storage system to a non-volatile portion based on a charge of the capacitors. For example, in one or more implementations, the series of acts 400 includes determining that a charge of the one or more capacitors is above a threshold charge. Based on the charge being above the threshold charge, the series of acts 400 may include selectively storing the additional data associated with the at least one user from the volatile portion of the storage system to the non-volatile portion of the storage system.

In one or more embodiments, the power handling configuration includes tuning parameters associated with allocating resources of the cloud computing system to one or more of write performance, data duration, and durability. In one or more implementations, the tuning parameters are established prior to deployment of the computing node on the cloud computing system. In one or more implementations, the series of acts 400 includes modifying one or more of the tuning parameters based on a capacitance of the capacitors and a quantity of data from the identified subset of data.

Figure 5:
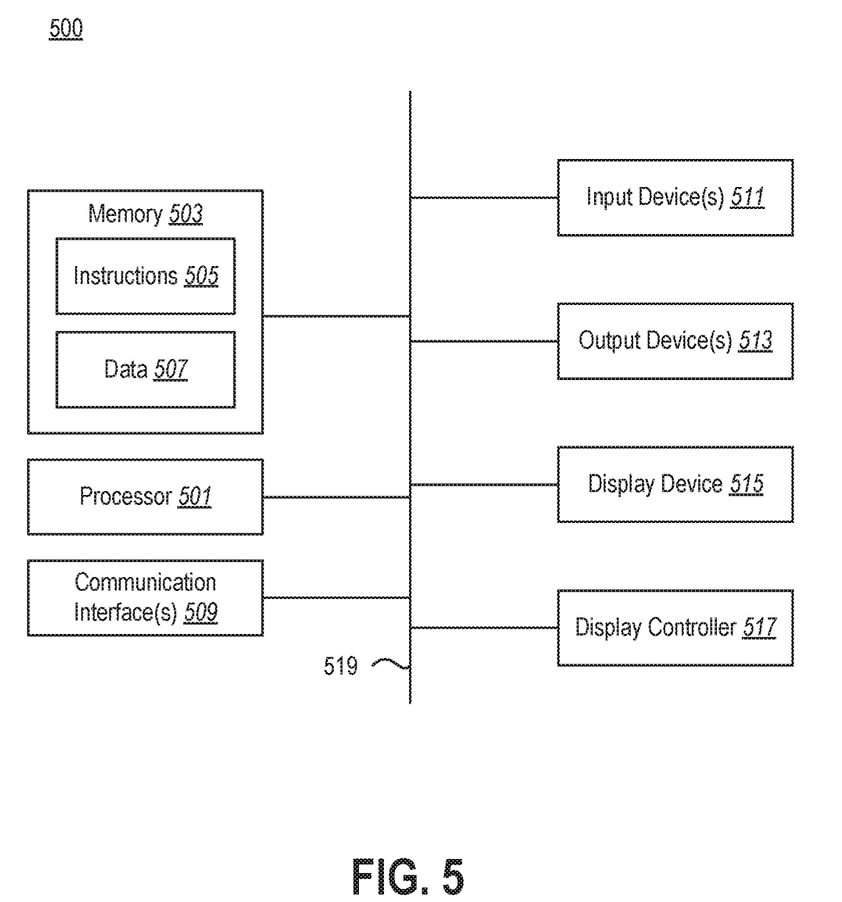
FIG. 5 illustrates certain components that may be included within a computer system.

FIG. 5 illustrates certain components that may be included within a computer system 500. One or more computer systems 500 may be used to implement the various devices, components, and systems described herein.

The computer system 500 includes a processor 501. The processor 501 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 501 may be referred to as a central processing unit (CPU). Although just a single processor 501 is shown in the computer system 500 of FIG. 5, in an alternative configuration, a combination of processors (e.g., an ARM and DSP) could be used.

The computer system 500 also includes memory 503 in electronic communication with the processor 501. The memory 503 may be any electronic component capable of storing electronic information. For example, the memory 503 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 505 and data 507 may be stored in the memory 503. The instructions 505 may be executable by the processor 501 to implement some or all of the functionality disclosed herein. Executing the instructions 505 may involve the use of the data 507 that is stored in the memory 503. Any of the various examples of modules and components described herein may be implemented, partially or wholly, as instructions 505 stored in memory 503 and executed by the processor 501. Any of the various examples of data described herein may be among the data 507 that is stored in memory 503 and used during execution of the instructions 505 by the processor 501.

A computer system 500 may also include one or more communication interfaces 509 for communicating with other electronic devices. The communication interface(s) 509 may be based on wired communication technology, wireless communication technology, or both. Some examples of communication interfaces 509 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 500 may also include one or more input devices 511 and one or more output devices 513. Some examples of input devices 511 include a keyboard, mouse, microphone, remote control device, button, joystick, trackball, touchpad, and lightpen. Some examples of output devices 513 include a speaker and a printer. One specific type of output device that is typically included in a computer system 500 is a display device 515. Display devices 515 used with embodiments disclosed herein may utilize any suitable image projection technology, such as liquid crystal display (LCD), light-emitting diode (LED), gas plasma, electroluminescence, or the like. A display controller 517 may also be provided, for converting data 507 stored in the memory 503 into text, graphics, and/or moving images (as appropriate) shown on the display device 515.

The various components of the computer system 500 may be coupled together by one or more buses, which may include a power bus, a control signal bus, a status signal bus, a data bus, etc. For the sake of clarity, the various buses are illustrated in FIG. 5 as a bus system 519.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   detecting a power loss event for a computing node of a cloud computing system, the computing node including a host system and a storage system configured to host a compute platform for one or more users of the cloud computing system, wherein the storage system includes a volatile portion including at least a portion of user data, user metadata, and system metadata, a non-volatile portion, and one or more capacitors coupled to the volatile portion and the non-volatile portion of the storage system;
   identifying a power handling configuration including instructions for responding to one or more power loss events, wherein the power handling configuration includes an identification of a first subset of data including the system metadata on the volatile portion of the storage system to prioritize for storage on the non-volatile portion of the storage system over a second subset of data including the at least a portion of user data and the user metadata; and
   in response to the detected power loss event and in accordance with the identified first subset of data from the power handling configuration, selectively storing the first subset of data from the volatile portion of the storage system to the non-volatile portion of the storage system.

2. The method of claim 1, wherein the compute platform comprises a virtual machine (VM) hosted on the computing node, the method further comprising detecting the power loss event based on a user of the VM being evicted from the node or the VM being removed from the computing node.

3. The method of claim 1, wherein the one or more capacitors has a combined capacitance corresponding to the size of the identified first subset of data.

4. The method of claim 1, wherein the host system and the storage system are configured to host the compute platform for a plurality of users of the cloud computing system, and wherein the power handling configuration further includes an identification of at least one user from the plurality of users to prioritize in selectively storing additional data from the volatile portion of the storage system to the non-volatile portion of the storage system.

5. The method of claim 4, further comprising:
   determining that a charge of the one or more capacitors is above a threshold charge; and
   based on the charge being above the threshold charge, selectively storing the additional data associated with the at least one user from the volatile portion of the storage system to the non-volatile portion of the storage system.

6. The method of claim 1, wherein the power loss event is an unplanned power loss event, and wherein selectively storing the first subset of data comprises flushing the first subset of data to the non-volatile portion of the storage system prior to the one or more capacitors discharging.

7. The method of claim 1,
   wherein the first subset of data from the volatile portion of the storage system comprises:
      system metadata associated with one or more characteristics of hardware of the storage system,
   wherein the second subset of data from the volatile portion of the storage system comprises:
      in-flight data; and
      user metadata associated with user data stored on the non-volatile portion of the storage system, and
   wherein selectively storing the first subset of data comprises flushing the system metadata to the non-volatile portion of the storage system without storing the in-flight data and the user metadata to the non-volatile portion of the storage system.

8. The method of claim 1, further comprising recovering a state of the computing node, the state of the computing node including a previous state of the computing node prior to detecting the power loss event, where recovering the state of the computing node comprises accessing user data from a long-term storage backup service provided by another computing node of the cloud computing system.

9. The method of claim 1, wherein the storage system includes a solid-state drive (SSD) system, the SSD system comprising a static random-access memory (SRAM) component and a dynamic random-access memory (DRAM) component.

10. The method of claim 9, wherein the first subset of data comprises system metadata from the DRAM component of the SSD system.

11. The method of claim 9, further comprising, in response to the detected power loss event and in accordance with the power handling configuration, shutting down the SRAM component to prevent the SRAM component from receiving any charge from the one or more capacitors.

12. A system, comprising:
one or more processors;
memory in electronic communication with the one or more processors; and
instructions stored in the memory, the instructions being executable by the one or more processors to:
detect a power loss event for a computing node of a cloud computing system, the computing node including a host system and a storage system configured to host a compute platform for one or more users of the cloud computing system, and wherein the storage system includes a volatile portion including at least a portion of user data, user metadata, and system metadata, a non-volatile portion, and one or more capacitors coupled to the volatile portion and the non-volatile portion of the storage system;
identify a power handling configuration including instructions for responding to one or more power loss events, wherein the power handling configuration includes an identification of a first subset of data including the system metadata to prioritize for storage on the non-volatile portion of the storage system over a second subset of data including the at least a portion of user data and the metadata; and
in response to the detected power loss event and in accordance with the identified first subset of data from the power handling configuration, selectively store the first subset of data from the volatile portion of the storage system to the non-volatile portion of the storage system.

13. The system of claim 12, wherein the compute platform comprises a virtual machine (VM) hosted on the computing node, and further comprising instructions being executable by the one or more processors to detect the power loss event based on a user of the VM being evicted from the node or the VM being removed from the computing node.

14. The system of claim 12, wherein the host system and the storage system is configured to host the compute platform for a plurality of users of the cloud computing system, and wherein the power handling configuration further includes an identification of at least one user from the plurality of users to prioritize in selectively storing additional data from the volatile portion of the storage system to the non-volatile portion of the storage system, and further comprising instructions being executable by the one or more processors to:
determine that a charge of the one or more capacitors is above a threshold charge; and
based on the charge being above the threshold charge, selectively store the additional data associated with the at least one user from the volatile portion of the storage system to the non-volatile portion of the storage system.

15. The system of claim 12,
wherein the first subset of data from the volatile portion of the storage system comprises:
system metadata associated with one or more characteristics of hardware of the storage system,
wherein the second subset of data from the volatile portion of the storage system comprises:
in-flight data; and
user metadata associated with user data stored on the non-volatile portion of the storage system, and
wherein selectively storing the first subset of data comprises flushing the system metadata to the non-volatile portion of the storage system without storing the in-flight data and the user metadata to the non-volatile portion of the storage system.

16. The system of claim 12, wherein the storage system includes a solid-state drive (SSD) system, the SSD system comprising a static random-access memory (SRAM) component and a dynamic random access memory (DRAM) component, and wherein the subset of data comprises system metadata from the DRAM component of the SSD system.

17. The system of claim 12, wherein the power handling configuration further includes tuning parameters associated with allocating resources of the cloud computing system to one or more of write performance, data duration, and durability, wherein the tuning parameters are established prior to deployment of the computing node on the cloud computing system.

18. The system of claim 12, wherein the power handling configuration includes tuning parameters associated with allocating resources of the cloud computing system to one or more of write performance, data duration, and durability, and further comprising instructions being executable by the one or more processors to modify one or more of the tuning parameters based on a capacitance of the one or more capacitors and the size of identified subset of data.

19. A non-transitory computer readable medium storing instruction thereon that, when executed by one or more processors, causes a computing device to:
detect a power loss event for a computing node of a cloud computing system, the computing node including a host system and a storage system configured to host a compute platform for one or more users of the cloud computing system, and wherein the storage system includes a volatile portion including at least a portion of user data, user metadata, and system metadata, a non-volatile portion, and one or more capacitors coupled to the volatile portion and the non-volatile portion of the storage system;
identify a power handling configuration including instructions for responding to one or more power loss events, wherein the power handling configuration includes an identification of a first subset of data including the system metadata to prioritize for storage on the non-volatile portion of the storage system over a second subset of data including the at least a portion of user data and the metadata; and
in response to the detected power loss event and in accordance with the identified first subset of data from the power handling configuration, selectively store the first subset of data from the volatile portion of the storage system to the non-volatile portion of the storage system.

20. The non-transitory computer readable medium of claim 19,
wherein the first subset of data from the volatile portion of the storage system comprises:
system metadata associated with one or more characteristics of hardware of the storage system,
wherein the second subset of data from the volatile portion of the storage system comprises:
in-flight data; and
user metadata associated with user data stored on the non-volatile portion of the storage system, and
wherein selectively storing the first subset of data comprises flushing the system metadata to the non-volatile portion of the storage system without storing the in-flight data and the user metadata to the non-volatile portion of the storage system.

* * * * *